United States Patent [19]

Baumgaértner

[11] 4,036,689
[45] July 19, 1977

[54] MULTICHAMBER HYDROGEN GENERATING PLANT HEATED BY NUCLEAR REACTOR COOLING GAS

[75] Inventor: Heinrich Baumgaértner, Ketsch, Germany

[73] Assignee: Hochtemperatur-Reactorbau GmbH, Cologne, Germany

[21] Appl. No.: 634,053

[22] Filed: Nov. 21, 1975

[30] Foreign Application Priority Data

Nov. 23, 1974 Germany ............................. 2455507

[51] Int. Cl.² ............................................. G21D 9/00
[52] U.S. Cl. ....................................... 176/39; 176/60; 176/87; 423/248; 423/650
[58] Field of Search ...................... 176/38, 39, 60, 65, 176/87; 423/248, 650, 651

[56] References Cited

U.S. PATENT DOCUMENTS

| 3,115,449 | 12/1963 | Fortescue et al. | 176/60 |
| 3,371,017 | 2/1968 | Coast et al. | 176/87 |
| 3,535,082 | 10/1970 | Nurnberg et al. | 176/39 X |
| 3,558,047 | 1/1971 | Nurnberg et al. | 176/39 X |
| 3,649,451 | 3/1972 | Yedida et al. | 176/37 |
| 3,656,566 | 4/1972 | Coast et al. | 176/60 X |
| 3,802,993 | 4/1974 | von Fredersdorff et al. | 176/39 X |
| 3,897,838 | 8/1975 | Hosegood | 176/60 |
| 3,923,466 | 12/1975 | Seelig et al. | 176/39 X |

FOREIGN PATENT DOCUMENTS

1,116,479 6/1968 United Kingdom ................. 176/39

Primary Examiner—Peter A. Nelson
Attorney, Agent, or Firm—Bacon & Thomas

[57] ABSTRACT

Disclosed is plant for the production and utilization of heat energy derived from a gas-cooled, high temperature nuclear reactor, preferably to produce hydrogen in secondary reactors, comprising a thick-walled vessel; a high temperature reactor contained in a centrally oriented cavity within the vessel; a number of steam generators corresponding to the number of the secondary reactors, the generators likewise being contained in the wall of the vessel; a number of blowers corresponding to the number of the steam generators each of the blowers also being contained in the wall of the vessel and being positioned beneath one of the steam generators; conduit means for transporting hot cooling gas from the nuclear reactor to the secondary reactors and from the secondary reactors to the blowers; and conduit means for transporting the cooling gas from each of the blowers to the nuclear reactor in a manner so that the gas surrounds the nuclear reactor, the secondary reactors, the blowers and the hot gas conduit means.

15 Claims, 3 Drawing Figures

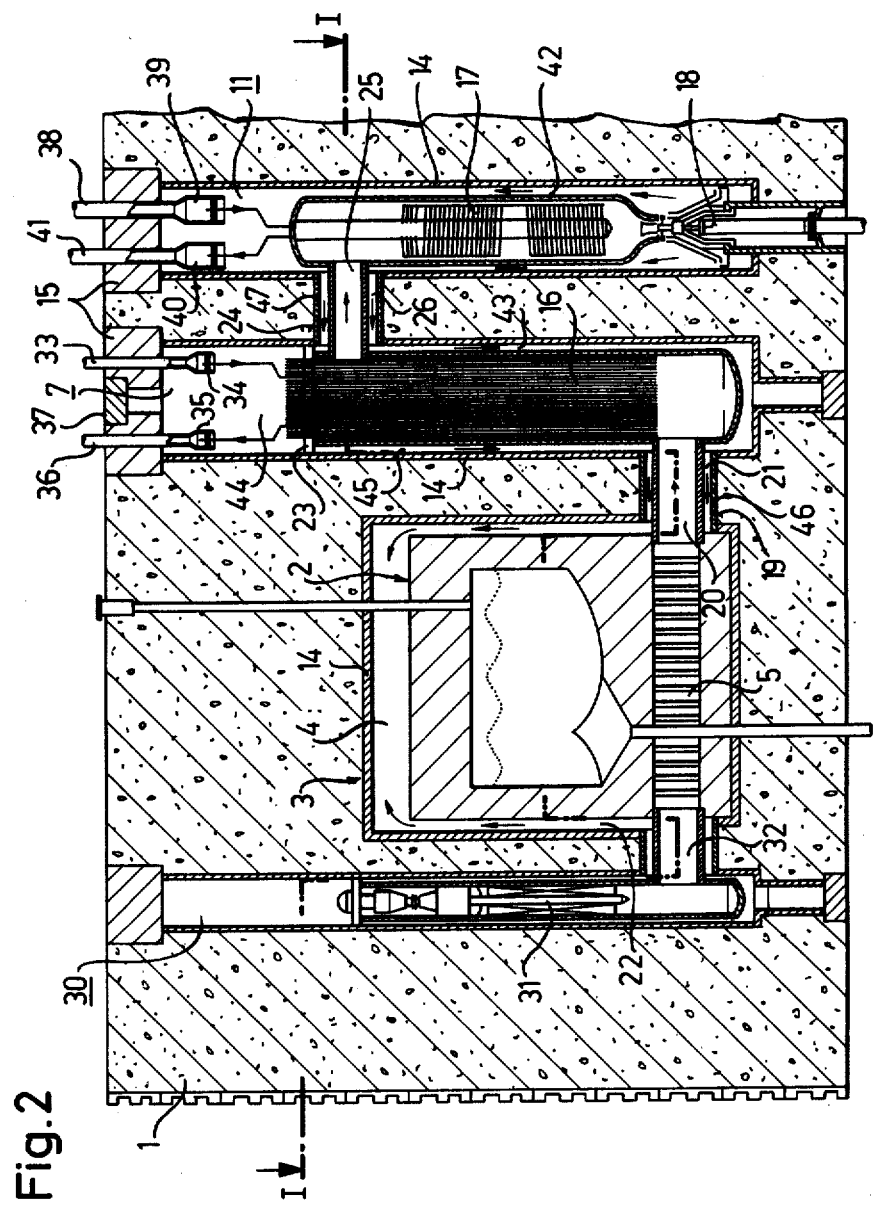

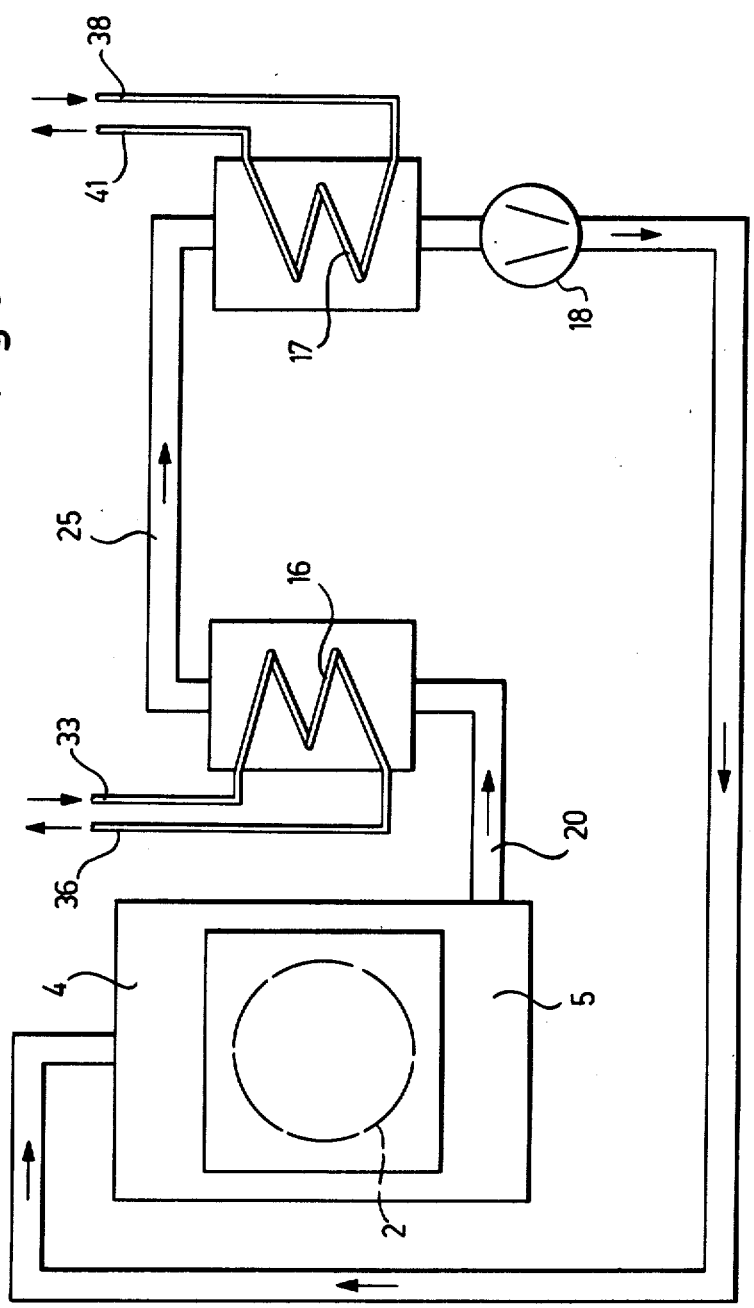

MULTICHAMBER HYDROGEN GENERATING PLANT HEATED BY NUCLEAR REACTOR COOLING GAS

BACKGROUND OF THE INVENTION

The present invention concerns a process heating plant comprising a plurality of reaction chambers, preferably tubular cracking ovens intended for the production of hydrogen, which are heated by the cooling gas derived from a high-temperature reactor whereby the reaction chambers are installed together with the high-temperature reactor in one common pressure vessel made of pre-stressed concrete, and whereby additional energy-consuming components, such as steam generators, are installed in the gas cooling circuit of the reactor.

It is known practice to build nuclear power plants by the integrated construction method whereby, in addition to the reactor core, also a gas turbine, a compressor and components for heat exchange are all installed inside a common concrete pressure vessel. In German Offenlegungsschrift (DOS) No. 2,062,934 a gas-cooled nuclear reactor is described wherein the gas turbine has been installed in a hollow space in the wall of the pressure vessel which encloses the reactor core. Another nuclear reactor of similar construction is described in DOS No. 1,764,249. In that disclosure the nuclear reactor together with all components comprising the circuit are installed in tightly spaced, parallel and vertical bores inside the concrete pressure vessel and the components are accessible from the outside. Passages for the cooling medium are provided both in the wall of the pressure vessel and also between the several bores.

Furthermore, a nuclear plant with a closed gas-cooling circuit supplying the necessary process heat has been proposed wherein the heat generated by a high-temperature reactor is first transferred to an intermediate circuit before being applied to its ultimate purpose, the process. The heat can be used, for instance, for the cracking of process gas in tubular cracking ovens and for the generation of electric power in steam turbine circuits. For such purposes, the components comprising the primary circuit, i.e., the reactor, heat exchangers, and blowers, are installed in cavities inside a concrete vessel, while the components comprising the process circuit as well as the circuit for the steam turbine are installed outside the safety vessel surrounding the reactor.

The two plants first referred to have two features in common: they are both equipped with a gas-cooling circuit completely integrated inside the concrete pressure vessel, and the energy generated by the reactor is utilized to drive a gas turbine and, subsequently, generate electric power. In contrast to the above, in the power plant mentioned last, the energy is first transferred to an intermediate circuit and then subsequently used for the generation of process gas.

The medium circulating in the secondary circuit may be a gas, for instance, helium. But a liquid heat-transfer medium may also be used. Such a plant is described in the German Auslegeschrift (DAS) No. 1,933,695, wherein the heat derived from the cooling medium in a nuclear reactor is transferred in a heat exchanger to molten lead, which, in turn, transfers it to a reaction system. The heat exchangers and the assembly of components in which the reaction takes place are installed in a common vessel and this vessel itself is installed, together with the nuclear reactor, in a common pressure vessel.

Also, from German Pat. Nos. 1,298,233 and 1,589,999 a method is known whereby the heat contained in the medium of a cooling circuit is directly applied to the components utilizing the process heat, without the use of an intermediate circuit. In the first disclosure, heated helium is conveyed so that it flows directly around the catalyst-filled tubes of a methane cracking plant. In the second patent, a process for the production of hydrogen is described wherein the energy obtained form the reactor is brought to a reaction chamber charged with a granulated metal oxide through which streams a mixture of steam and carbon monoxide.

SUMMARY OF THE INVENTION

The present invention has as one object to improve upon art as described.

It is also an object of the invention to provide a process-heat plant to transfer the heat obtained from a high-temperature reactor directly to the reaction chambers with exclusion of an intermediate circuit.

Another object of the invention resides in the provision of a process heat plant wherein the reaction chamber, together with the reactor core, are installed in one common pressure vessel.

The foregoing objects are accomplished by providing according to the invention a plant for the production and utilization of heat energy derived from a gas-cooled, high temperature nuclear reactor, preferably to produce hydrogen in secondary reactors, comprising a thick-walled vessel; a high temperature reactor contained in a centrally oriented cavity within the vessel; a number of steam generators corresponding to the number of the secondary reactors, the generators likewise being contained in the wall of the vessel; a number of blowers corresponding to the number of the steam generators each of the blowers also being contained in the wall of the vessel and being positioned beneath one of the steam generators; conduit means for transporting hot cooling gas from the nuclear reactor to the secondary reactors and from the secondary reactors to the blowers; and conduit means for transporting the cooling gas from each of the blowers to the nuclear reactor in a manner so that the gas surrounds the nuclear reactor, the secondary reactors, the blowers and the hot gas conduit means.

Several problems arise from the fact that, in order to generate a process gas, such as hydrogen, the exit temperature of the reactor must be at least 900° C., while, at the same time, the reaction vessels (such, as for instance, tubular cracking ovens) must be easily accessible for the purpose of replacing the catalyst at regular intervals.

The main problem involves the installation of the components comprising the gas-cooling (primary) circuits, which include, in addition to the reaction chambers, also the steam generators and the blowers. All of these components must be installed in such a way that they are easily accessible and so that each can be individually removed. At the same time, thought must be given to the requirement of holding down the exterior dimensions of the pressure vessel to an absolute minimum.

A further problem is posed with respect to the heat insulation on the elements of the gas cooling circuit which are exposed to high temperatures, in particular, the gas ducts.

The present invention focuses on the task of overcoming the problems mentioned by means of a specific disposition of all the components and gas ducts.

The task is accomplished according to the invention through the division of the gas-cooling (primary) circuit into a plurality of identical loops, each loop comprising, in series, a reaction chamber, a steam generator, a blower, and gas conduits. All components are removably installed in pods inside the wall of a pressure vessel made of pre-stressed concrete and the pods are arranged symmetrically around the high-temperature reactor which is located in a cavity. The reaction chambers and steam generators are installed in separate pods, and the blowers are installed directly underneath the steam geneators. The return flow of relatively cold gas from the blowers back to the high-temperature reactor is accomplished by passing it through the pods and through ducts provided between each pod in each loop, as well as through ducts which connect the pods with the reactor cavern. During its return, the cold gas flows as an enveloping stream around the components exposed to higher temperature.

The primary circuit is thereby divided into a plurality of identical loops which are connected to each other only via the high-temperature reactor.

While the reaction chambers and the steam generators are accessible for removal and/or installation from the top, access to the relatively light-weight blowers, each installed underneath a steam generator, is accomplished from the bottom. Thereby each component can be independently removed.

It is advantageous to provide the reactor cavity, the gas ducts, and the pods provided for the installation of components inside the pressure vessel with gas-tight steel liners. While any surges in pressure that may occur are absorbed by the concrete material, any build-up of excessibely high temperatures inside the concrete is avoided by cooling the liners on the concrete side with water, and also by installing insulating material on the inside.

The reaction chambers are preferably designed as tubular cracking ovens for the production of hydrogen. It is of advantage to form separate chambers when the tubular cracking ovens are installed in their respective pods. This is done by installing packing between the carrier plate from which the cracking tubes are suspended, and the mounting flange on the liners of the pods. The upper chamber so created is filled with pure helium. Provided that the helium is kept under a pressure exceeding that of the cooling gas moving underneath the carrier plate, any possible leakage of the pure helium will only seep into the primary circuit, and therefore, any contamination of the chamber above the carrier plate of each tubular cracking oven by the radioactive content of the gas in the primary circuit, which is also helium, is positively prevented. It is thereby guaranteed that chamber which contains the connecting couplings of the several cracking tubes is accessible without the risk of exposure to radiation. This is a necessary feature because the catalyst in the cracking tubes which under the influence of heat causes the mixture of methane and steam to separate into hydrogen, carbon monoxide, carbon dioxide, methane and steam, must be replaced at approximately four-year intervals.

In addition to the aforementioned components comprising the primary circuit which are integrated inside the concrete pressure vessel, the complete plant comprises in addition a process circuit and a steam turbine circuit having a plurality of components.

Since the present invention is concerned only with such component parts as are installed inside the concrete pressure vessel, no description is given of either the process- or the steam-turbine circuits.

The reaction chambers and the steam generators are installed on the same level with the reactor core and parallel to each other inside the concrete pressure vessel. It is thereby possible to reduce to a minimum the length of the tubes through which the hot gas moves, and thereby to minimize the thermal stresses in the concrete. Therefore all gas-carrying connecting tubes between the pods in each loop as well as between the centrally located reactor cavity and the pods in which the reaction chambers are installed, are constructed in straight lines and oriented horizontally, thereby affording the shortest possible connection between the several components.

The transfer of hot gas from the high-temperature reactor the reaction chambers, i.e., to the tubular cracking ovens, is accomplished through ducts which protrude radially at the base of the reactor cavity and enter into the respective pods underneath the cracking ovens.

Underneath the carrier plates from which each cracking oven is suspended, a gas duct is provided which connects the oven with the respective steam-generator. All gas conduits are constructed as coaxial systems.

The heated cooling gas emerging from the bottom of the nuclear reactor is first moved through the radial hot-gas ducts into the tubular cracking ovens into which it enters from below; the gas streams around the cracking tubes, and in so passing is cooled down to a moderate temperature; it then moves out of the cracking chambers underneath the carrying plates and passes through the inner tubes of the coaxial ducts into the steam generators from above. There it flows downwardly (around the steam-generating tubes) on the outor shell-side, thereby being cooled further; it is subsequently compressed by the blowers connected downstream.

The cooling gas is returned from the blowers to the high-temperature reactor coaxially with respect to the components and the gas pipes. It first streams upwardly through an annular space formed between the steam generator and the inside wall of the pod containing it in each loop. It is then moved into the pod containing the tubular cracking oven, passing through the exterior annular space of the coaxial duct installed between each cracking oven pod and steam generator pod. The gas then passes downwardly through an annular space between the tubular cracking oven and the wall of its respective pod and then moves into the reactor cavity through the exterior annular space of the coaxial duct between the high-temperature reactor and the tubular cracking oven. In an annular space between the cavity and the high-temperature reactor, the gas streams upwardly, and finally enters into the reactor itself from above.

As a result of the above-described sequential progress of the gas from the blowers to the reactor, a circuit has attained whereby the relatively cooler gas streams, on its way to the reactor, around all structural elements and components which are exposed to high temperatures, and thereby, the problems connected with heat insulation are reduced substantially.

In a preferred embodiment, having a thermal output of the nuclear reactor equal to 2,000 MW, the primary circuit comprises four identical loops wherein the components are installed inside the concrete pressure vessel at 90° angles with respect to one another. The pods in which the four reaction chambers with the tubular cracking ovens are installed and the pods in which the four steam generators are installed are symmetrically located in circular patterns of different radii.

All pods are closed at the top by pressure- and gas-tight lids. For purposes of removal of the individual components, the respective lid is taken off, and after the gas lines have been shut off, the components can be dismantled as units, from the top or bottom, as the case may be.

The pipes connecting the tubular cracking ovens integrated in the pressure vessel with the process components and/or connecting the steam generators with the steam-turbine assembly are preferably installed so as to pass through the lids. The mixture of methane and steam entering the tubular cracking ovens is distributed over the several cracking tubes by a manifold installed in the space above the carrier plate of the tubular cracking oven. The mixture streams through the cracking tubes in a downward direction and is cracked by the combined effects of the heat supply and the catalyst. The cracking gas then passes through a tube which has a diameter smaller than that of the cracking tube (which is installed inside each cracking tube) and which at its lower end is extended outwardly into the collector space at the bottom of the cracking tubes. Thus, from this collector chamber, the cracking gas flows back up to the top of the cracking oven where it is collected in a collector installed in each oven before it is finally passed out of the pressure vessel. The connections of the water- or steam supply for the steam generator are designed in a similar manner. In each steam-generator assembly, the water supply is first distributed over the several vertical steam-generating pipes which are installed centrally, and flows in a downward direction. The water then flows upwardly through the helical steam generating pipes. The live steam produced is collected and ultimately streams out of the vessel.

Suitably and advantageously, a secondary cooling system is provided inside the concrete pressure vessel, comprising in a conventional manner, a blower, a check valve, and a cooler. The secondary cooling system operates independently from the primary circuit and insures the disposal of residual fission heat in the event of a break-down of the plant and also at times of a shutdown. During the normal operation of the nuclear reactor, a minor by-pass stream of the gas fed into the reactor flows through this system in a reverse direction. The secondary cooling system, having a capacity of 4 × 50%, is symmetrically installed in four pods placed in a circle around the reactor cavity in the spaces between the pods in which the components of the primary circuit are installed. The entire plant therefore comprises twelve pods, wherein the four pods provided for the secondary cooling system are smaller than those provided for the reaction chambers and the steam generators.

Further objects, features and advantages will become apparent from the following detailed description of preferred embodiments when considered with the attached figures of the drawing.

BRIEF DESCRIPTION OF THE DRAWINGS

In the drawings:

FIG. 2 is a fragmentary vertical sectional view taken along the staggered line II — II in FIG. 1;

FIG. 3 is a schematic flow chart of the primary cooling circuit.

DETAILED DESCRIPTION OF THE PREFERRED EMBODIMENTS

Figure 1:
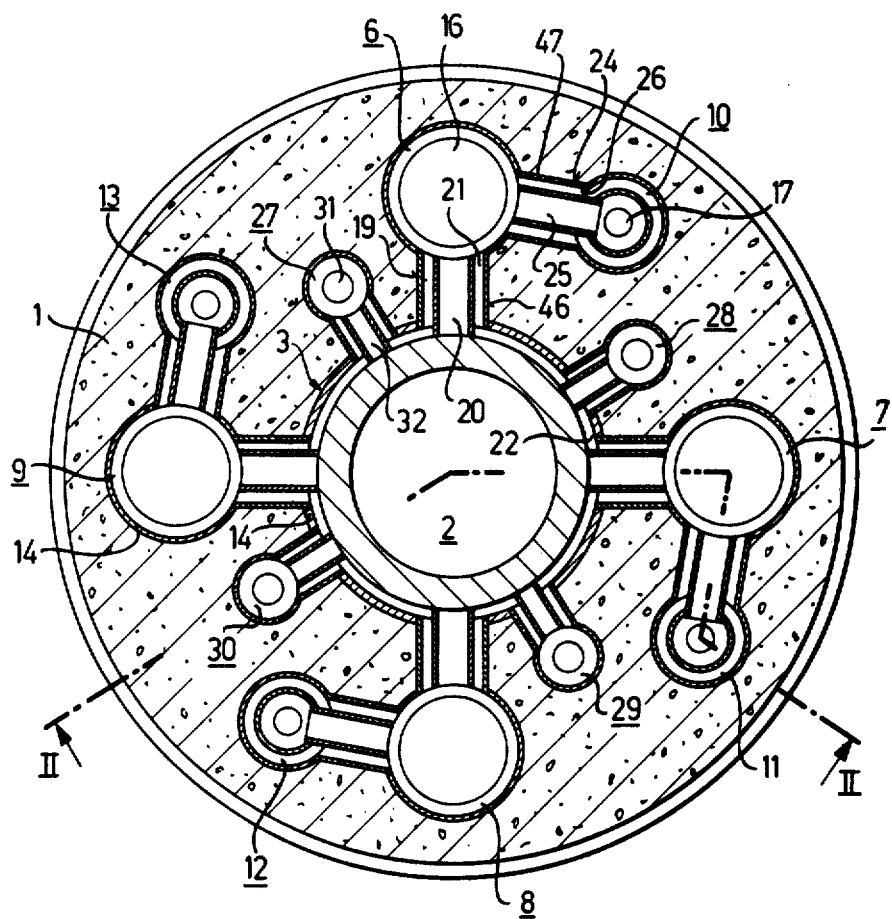
FIG. 1 is a horizontal sectional view of a process-heat plant a-cording to the invention, taken along the staggered line I — I in FIG. 2, with the elements in the pods being omitted for clarity.

FIGS. 1 and 2 show an explosion-proof, pressure-tight safety tank 1 of cylindrical shape made of reinforced concrete. Centrally inside the safety tank is located a helium-cooled high-temperature reactor 2 having ball-shaped fuel elements together with the set of components which makes up the primary circuit described in detail below (the tubular cracking ovens, steam generators, blowers, gas lines, and the secondary cooling system).

The high-temperature reactor 2 is built into a cavity 3. Above the reactor core is provided a collection chamber 4 which receives the cold helium gas entering the reactor. Underneath the floor of the reactor core is a pillared collection chamber 5, which receives the heated helium released by the reactor core. The reactor 2 is connected with the primary circuit by four radially symmetrical inlet pipes and four outlet pipes.

In a circle around reactor vessel 3, four pods 6, 7, 8, 9 are placed, spaced symmetrically with respect to each other at 90° angles. In a circle having a larger radius, four additional pods 10, 11, 12, 13 are installed, likewise spaced symmetrically to each other and parallel to pods 6, 7, 8, 9. Like reactor cavern 3, these large passageways are lined with water-cooled and heat-insulated steel liners 14 and are closed off by explosion-proof lids 15 which are installed with an excess number of fasteners.

In each of the four pods 6, 7, 8, 9 a tubular cracking oven 16 is installed on the same level with the reactor core. Connected downstream with each tubular cracking oven 16 is a steam generator 17 installed respectively in pods 10, 11, 12, 13. As shown by FIG. 2, underneath each steam generator 17 in each pod 10, 11, 12, 13, a blower assembly 18 is provided, comprising a single-stage axial blower.

While the tubular cracking oven 16 and the steam generator 17 are accessible for removal from the top of the plant, the blowers 18 are to be removed from the bottom.

Pods 6, 7, 8, 9 are connected to reactor cavity 3 by horizontal passageways 19. A coaxial gas duct 46 is installed in passageway 19, through which the hot gas from the reactor outlet moves in the inner duct 20, while the gas entering into the reactor passes through the exterior annular conduit 21. The cold gas is moved to collection chamber 4 through an annular space 22 formed between the high-temperature reactor 2 and the reactor cavity 3.

The tubular cracking ovens 16 are suspended in each pod from the support plate 23 by means of a flange which is attached to liner 14. The junction between the support plate 23 and the liner 14 is sealed off, thereby creating two entirely separate chambers 44 and 45. The upper chamber 44 is filled with helium gas under a pressure slightly in excess of that of the primary gas.

Below the support plate 23 in each tubular cracking oven 16, horizontal passageways 24 connect the pods 6, 7, 8, 9 to the respective adjacent pods 10, 11, 12, 13. In these passageways, coaxial ducts 47 are likewise installed. Through the inner coaxial pipes 25 the gas streaming out of the cracking ovens 16 is moved into the steam generators 17; the relatively colder gas is then compressed by blower system 18 and passes through annular passage 26 and is moved back into the high-temperature reactor.

The entire primary circuit is thus divided into four identical loops which are combined over the nuclear reactor 2. Each loop comprises a tubular cracking oven 16, a steam generator 17, a blower 18 and the necessary gas conduits.

In addition, pods 27, 28, 29, 30 are provided which are likewise symmetrically installed at a 90° angle with respect to each other on a circle having a radius smaller than that on which the pods 6, 7, 8, 9 are installed. In these pods 27, 28, 29, 30 a secondary or auxiliary cooling system 31 is installed (not shown in detail in the drawings). Secondary cooling system 31 is likewise connected to the nuclear reactor 2 by means of a radial, coaxial gas duct 32, and the system has the capacity to provide for the disposal of 50% of the residual fission heat.

The mixture of methane and steam which is fed into the cracking ovens 16 passes through ducts 33 which are installed so as to penetrate through the lids 16 of pods 6, 7, 8, 9 to the manifold 34 where it is distributed over individual cracking tubes welded to the support plate 23. The gas, after being cracked, is collected in the collection chamber 35 and is subsequently removed through pipe 36 to the processing unit (not shown in detail). The spaces 44 above the support plates 23 in pods 6, 7, 8, 9 are accessible by way of access tunnels 37 installed in pod lids 15, so that the catalyst contained in the cracking tubes can be replaced.

The tubes connecting the steam generator 17 with the steam turbine assembly (not shown) are passed through the lids 15 of pods 10, 11, 12, 13. The water supply is passed through the pipes 38 to the manifold 39 where it is distributed over the several steam-generating tubes. The steam is superheated in the steam generator 17 and collected in the collection chamber 40 from where it passes through pipe 41 back to the steam turbine assembly.

The circuit of the primary gas through the reactor and through one of the four identical loops is described in detail as shown in the drawings, particularly in the flow chart shown in FIG. 3. The cold helium gas is brought into collection chamber 4 above the reactor core at a temperature of 410° C. under a pressure of 39.9 bar; it moves through the reactor core in a downward direction and is thereby heated; and it is collected in the pillared collection chamber 5. The helium is then distributed over the four parallel circulation loops through the four reactor outlet pipes.

After being heated to 930° C. and under a pressure of 39.2 bar, the helium is brought through the hot-gas pipes 20 to the tubular cracking ovens 16 where it enters from below and is cooled to a moderate temperature by the process gas streaming in the opposite direction. The primary gas is moved through the inner tube 25 of the coaxial duct 47 to the steam generator 17, entering it at a temperature of 780° C. at a pressure of 39.1 bar. It passes through the steam generator 17 in a downward direction on the shell side. In its passage, the gas is cooled by the fresh water supply to be vaporized, which flows countercurrently. The gas streams out of the steam-generator assembly at a temperature of 400° C. at 38.7 bar pressure. If the blower assembly connected to steam generator 17, the gas is compressed to 40 bar, the maximal pressure applied in the process circuit; the temperature of the gas is now 410° C.

In its return flow from the blower 18 back to the nuclear reactor 2, the gas travels around all the components of the primary circuit and around the hot-gas pipes through the outer spaces of the coaxial tube system. From the blower assemby 18, the relatively cold gas moves upwardly in its pod through an annular space 42 formed between the steam generator 17 and the steel liners 14. The gas then passes through the outer coaxial passage 26 installed between each corresponding pair of pods (6, 7, 8, 9, and 10, 11, 12, 13) into one of the pods 6, 7, 8, 9. Through another annular space 43, formed between the tubular cracking ovens 16 and the steel liners 14 in the corresponding pods, the gas streams downwardly and subsequently, through the outer tube of annular vent 21 installed in the horizontal passageway 19, it flows back into the reactor cavity. Finally, the helium is moved through annular space 22 formed between the high-temperature reactor 2 and the reactor cavity 3, back into the collection chamber 4.

The mixture of methane and steam is introduced into the tubular cracking oven 16 at a temperature of 650° C. at 43 bar pressure and passes out of the cracking oven at a temperature of 820° C. at 40 bar pressure. The temperature of the water supply entering the steam generator 17 amounts to 170° C., while the temperature of the live steam is 510° C.

The chamber 44 above the support plates 23 in all cracking ovens is filled with pure helium gas at a pressure of 41 bar.

What is claimed is:

1. A plant for the production and utilization of heat energy derived from a gas-cooled, high-temperature nuclear reactor, comprising:
   a. a thick-walled vessel;
   b. a high temperature reactor contained in a centrally oriented cavity within said vessel;
   c. a plurality of secondary reactors comprising cracking ovens for the production of hydrogen in first pods within the wall of said vessel;
   d. a number of steam generators corresponding to the number of said secondary reactors, said generators being contained in second pods within the wall of said vessel;
   e. a number of blowers corresponding to the number of said steam generators each of said blowers being contained in one of said second pods and being positioned beneath one of said steam generators;
   f. conduit means for transporting hot cooling gas from said nuclear reactor to said secondary reactors and from said secondary reactors to said blowers; and
   g. conduit means for transporting cooling gas of lower temperature from each of said blowers to said nuclear reactor comprising annular spaces surrounding said nuclear reactor, said secondary reactors, said blowers and said hot gas conduit means.

2. The plant according to claim 1, comprising four secondary reactors oriented with respect to each other at 90° angles.

3. The plant according to claim 1, comprising a plurality of identical circuits each including one of said secondary reactors, one of said steam generators and one of said blowers.

4. The plant according to claim 3, wherein said first and second pods containing secondary reactors, said steam generators and said blowers are lined with gas-tight steel liners, and said first and second pods are arranged symmetrically about said nuclear reactor.

5. The plant according to claim 4, wherein said secondary reactors comprise tubular cracking ovens, each being suspended from a supporting plate attached in a gas-tight sealing relationship to the liner in its pod, whereby two chambers are created the upper chamber of which is filled with pure helium gas held under a pressure exceeding that under which the cooling gas is kept.

6. The plant according to claim 1, wherein the secondary reactors and the steam generators are installed inside the pressure vessel on the same vertical level with the high temperature reactor.

7. The plant according to claim 4, wherein the secondary reactor in each of said circuits is contained in a first pod and the steam generator and blower of the same circuit is contained in a second pod, and said first pod is connected with the nuclear reactor by means of a coaxial conduit and said first and second pods are connected by means of a coaxial conduit.

8. The plant according to claim 7, wherein said coaxial conduits are linear and horizontally disposed.

9. The plant according to claim 4, wherein said hot gas conduits between said nuclear reactor and each of said secondary reactors extend radially from the lower portion of said nuclear reactor and enter said secondary reactor-containing pods below said secondary reactors.

10. The plant according to claim 5, wherein said hot gas conduits between the secondary reactors and the steam generators are installed underneath said supporting plates in each tubular cracking oven and are designed in the form of coaxial conduits.

11. The plant according to claim 4, wherein said cooling gas conduit means (g.) comprises an annular space between said nuclear reactor and the inside wall of its cavity, an annular space between each of said steam generators and the inside wall of its pod, an annular space between each of said secondary reactors and the inside wall of its pod and an annular, outer passageway in said coaxial conduits.

12. The plant according to claim 4, wherein the pods comprise pressure- and gas-tight sealing lids at the top and at the bottom.

13. The plant according to claim 12, comprising conduits for transporting a process fluid stream, which conduits extend from at least one of said secondary reactors or said steam generators out of said pressure vessel through said sealing lids, said conduits being adapted for connection with an installation utilizing said process fluid.

14. The plant according to claim 7, comprising a secondary cooling system installed inside said vessel, said system including a blower, a check-valve, and a cooler.

15. The plant according to claim 14, wherein said secondary cooling system is symmetrically installed in four pods, each located in the space between one of said first pods and the second pod of the adjacent circuit.

* * * * *